United States Patent [19]
Bingham et al.

[11] Patent Number: 5,493,308
[45] Date of Patent: Feb. 20, 1996

[54] CLOSE RANGE FAULT TOLERANT NONCONTACTING POSITION SENSOR

[75] Inventors: Dennis N. Bingham, Idaho Falls; Allen A. Anderson, Shelley, both of Id.

[73] Assignee: Lockheed Idaho Technologies Company, Idaho Falls, Id.

[21] Appl. No.: 209,662

[22] Filed: Mar. 9, 1994

Related U.S. Application Data

[63] Continuation-in-part of Ser. No. 69,647, Jun. 1, 1993, abandoned, which is a continuation-in-part of Ser. No. 896,867, Jun. 12, 1992, abandoned.

[51] Int. Cl.$^6$ .................................................. G01S 5/04
[52] U.S. Cl. ........................................ 342/442; 342/444
[58] Field of Search .................................. 342/442, 444, 342/445, 463, 465

[56] References Cited

U.S. PATENT DOCUMENTS 3,996,590  12/1976  Hammack ...................... 343/112 R
5,216,429  6/1993   Nakagawa et al. ................ 342/450
5,252,982  10/1993  Frei ................................... 342/357
5,280,295  1/1994   Kelley et al. ....................... 342/463
5,346,210  9/1994   Utke et al. ......................... 273/55 R Primary Examiner—Mark Hellner
Attorney, Agent, or Firm—Alan D. Kirsch

[57] ABSTRACT

A method and system for locating the three dimensional coordinates of a moving or stationary object in real time. The three dimensional coordinates of an object in half space or full space are determined based upon the time of arrival or phase of the wave front measured by a plurality of receiver elements and an established vector magnitudes proportional to the measured time of arrival or phase at each receiver element. The coordinates of the object are calculated by solving a matrix equation or a set of closed form algebraic equations.

41 Claims, 3 Drawing Sheets

5,493,308

CLOSE RANGE FAULT TOLERANT NONCONTACTING POSITION SENSOR

CONTRACTUAL ORIGIN OF THE INVENTION

The United States Government has rights in this invention pursuant to Contract No. DE-AC07-76ID01570 between the U.S. Department of Energy and EG&G Idaho, Inc. This is a continuation-in-part of application Ser. No. 08/069,647 filed Jun. 1, 1993 now abandoned, which was a continuation-in-part of application Ser. No. 07/896,867 filed Jun. 12, 1992, now abandoned.

BACKGROUND OF THE INVENTION

This invention relates to a method for the remote tracking in real-time of the spatial coordinates of a stationary or moving object in three dimensional space.

Interferometry methods for the location of an emitter source are known which require the knowledge of several parameters such as, waveform modulation, emitter signal angle of arrival or time of arrival, or measurements of angular rates between the emitter source and the measurements site. It is known in the art to use interferometry and tracking systems which utilized amplitude and phase comparison relationships to determine either the direction or spatial coordinates of a remote object relative to that of the receiver or an arbitrary reference. Conventional direction and range tracking systems typically utilize planar propagating electromagnetic waves. Conventional planar wave propagating systems become less accurate as the distance between the object under observation and the receiver decreases. For close range applications (which are generally considered to be where the location of the object relative to the sensory array is less than one hundred times the largest distance between sensor elements) the margin of error associated with conventional techniques is often unacceptable. Also, additional expense is required if spatial coordinates must be determined in addition to direction finding capability.

In order to obtain the actual coordinates of the emitter location using conventional plane wave propagating techniques, either triangulation methods, or range and direction detection methods are commonly used. Often, unacceptable system costs and limitations in tracking may result from additional measurement time requirements in such systems. If three dimensional rather than two dimensional tracking is required, time and cost requirements can be amplified even further. Due to the relatively large physical dimensions of interferometer sensors and triangulation baseline, serious limitations in performance and application often occur with the use of the planar wave interferometry. When the distance separating the receiver and the object decreases to a point where the accuracy of the tracking measurements is degraded to an unacceptable state, a different technique must be considered.

Optical and sub-optical frequency electromagnetic (EM) wave energies as well as acoustical wave energies, have been most commonly used. Systems such as optical interferometers utilized for direction tracking require mechanical servo mechanisms and are not fault tolerant, in that realignment and calculation of the target coordinates after power failure is required.

U.S. Pat. No. 4,788,548 of Hammerquist discloses a passive radar ranging system capable of determining the two dimensional range of an emitter source using four co-linear antenna receiver elements. However, the technique of Hammerquist is limited to two dimensional range determination.

It is an object of this invention to provide a method for the fault tolerant, continuous, real-time, high resolution determination of three dimensional spatial coordinates of objects.

It is another object of this invention to provide a method for determining in real-time close range three dimensional coordinates of objects using a broad spectrum of frequencies.

It is still another object of this invention to provide a method for determining the three dimensional full or half space coordinates of an object when the waveform is unmodulated, randomly modulated, or pulsed.

It is still a further object of this invention to provide a method for determining spatial coordinates or tracking of an object at low frequencies to penetrate poor climate and atmospheric conditions.

Additional objects, advantages and novel features of the invention will become apparent to those skilled in the art upon examination of the following and by practice of the invention.

SUMMARY OF THE INVENTION

To achieve the foregoing and other objects, this invention comprises a method and system for locating the three dimensional coordinates of a moving or stationary object in real-time, based upon the known geometric configuration of a propagating wave front. In one embodiment, the three dimensional coordinates of an object in half space are established based upon the phase of the wave front measured by a minimum of four receiver elements positioned in a planar antenna array. In another embodiment, the three dimensional coordinates in full space are calculated from the phase of the wave front measured by a minimum of five receiver elements in an configuration having no more that three sensors in a plane. The system can operate using optical and sub-optical frequency electromagnetic wave energies as well as acoustical wave energies. Additionally, the system provides exceptionally accurate tracking of objects at close range, exceeding that of conventional planar wave techniques.

BRIEF DESCRIPTION OF THE DRAWINGS

The present invention is illustrated in the accompanying drawings where.

DETAILED DESCRIPTION OF THE INVENTION

The present invention utilizes a propagating wave emanating from a source. In a preferred embodiment of the present invention for two dimensional tracking, the wave front is propagating radially outward from the object under observation. For three dimensional tracking, it is assumed that the wave front propagates spherically outward from the object. In a preferred embodiment, the present invention utilizes, but is not limited to signal frequencies for acoustic waves (longitudinal) of between 200 Hz to 50 kHz, and electromagnetic (traverse) radio frequencies of between 27 MHz to 23 GHz. The present invention is also capable of utilizing pulsed or single event emission sources.

Figure 1:
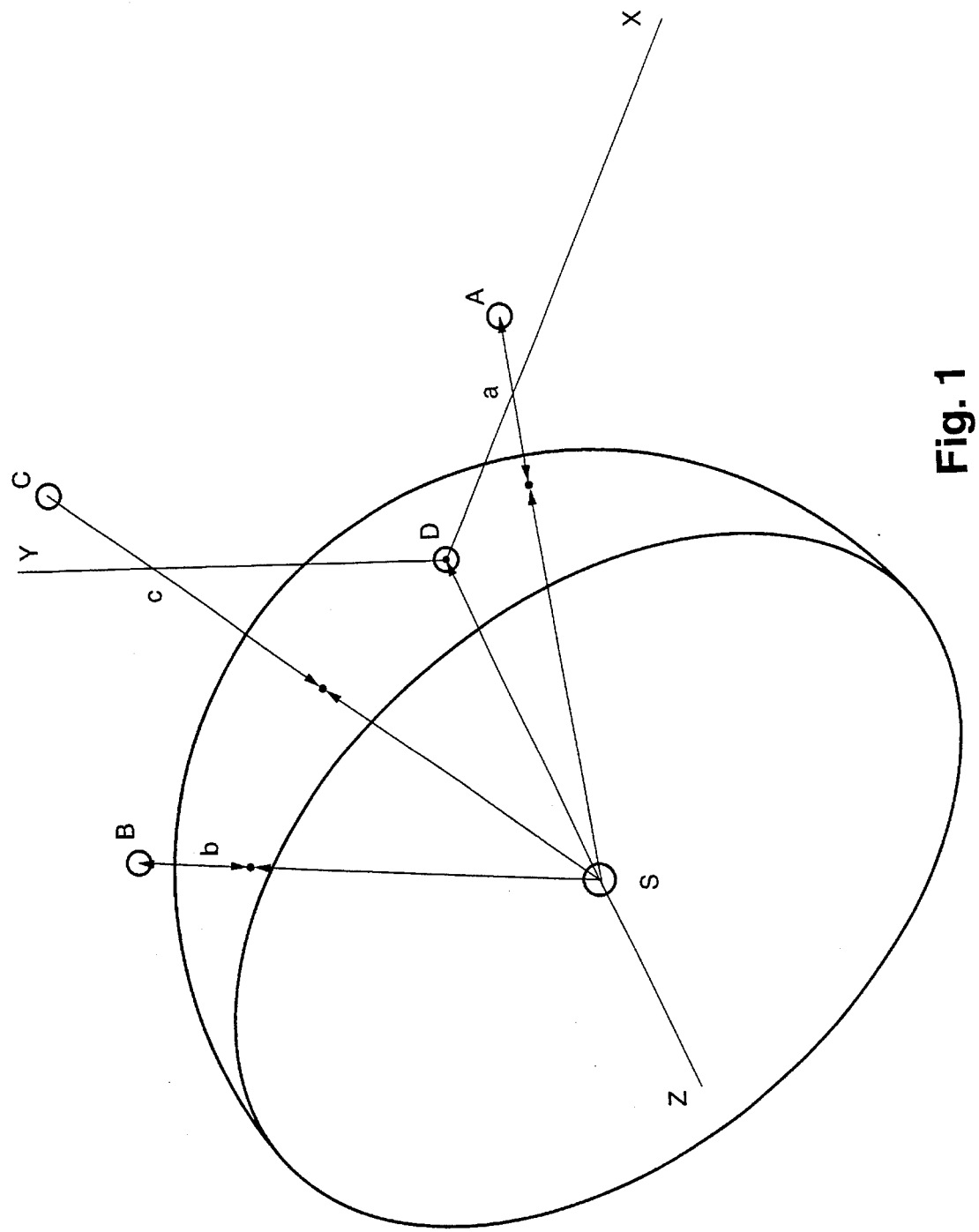
FIG. 1 is a graphical illustration of the position of the emitter and the antenna elements for the three dimensional half space coordinate determination or tracking.

Referring now to FIG. 1, the configuration of the present invention is shown for the coordinate determination or tracking of an object in three dimensional half space. The small circles in FIG. 1 represent sensors elements of either longitudinal or transverse waves. The small filled circles identify the location where a ray cast from the source through the sensor would pierce a sphere representing a feature in the propagating wave front. To track the position or coordinates of an object in three dimensional half space, a planar antenna array consisting of a minimum of four elements, depicted in FIG. 1 as elements A, B, C and D, are used for the receiver. In the simplest configuration, all of the receiver elements are located in the XY plane and are spatially offset from one another. An emitter, represented as E and located at coordinates Sx, Sy, Sz, is shown in FIG. 1 as emitting a propagating spherical equiphase wave front. The emitter (E) and receiver elements (A, B, C, and D) are positioned with respect to each other in the Cartesian coordinate system with receiver element D located at the origin. FIG. 1 shows a graphical representation of a spherical wave front. For one instant in time, the spherical wave front is shown passing through element D and is represented by the single spherical surface intersecting receiver element D. Unequal signal propagation times between the emitter and each of the receiver elements results in signal phase differences, which are referenced to the propagating signal wave front arriving at receiver element D. With this antenna array configuration, all three Cartesian coordinates Sx, Sy, and Sz of the emitter location may be determined. Three phase difference measurements are used to determine the emitter coordinates. In FIG. 1, $a$, $b$, and $c$ are electrical lengths corresponding to the phase differences between receiver element D and receiver element locations A, B, and C, respectively. These radii dimensions dynamically change as the coordinates of the emitter change.

The relationship between the signal phase and lengths a, b, and c are expressed as $$a = \frac{\psi_a \lambda}{2\pi} = \Delta t_a \upsilon, \quad b = \frac{\psi_b \lambda}{2\pi} = \Delta t_b \upsilon, \quad c = \frac{\psi_c \lambda}{2\pi} = \Delta t_c \upsilon \quad (1)$$

where $\lambda$ is the free space wavelength, $\psi_a$, $\psi_b$, and $\psi_c$ are the three phase differences measured in radians, $\Delta t_a$, $\Delta t_b$, and $\Delta t_c$ are the measured differences in times of arrival for the wave front at each sensor element with respect to that at element D, and $\upsilon$ is the velocity of the propagating wave. Equation (1) illustrates the relationship between the time and phase differences of the wave (i.e., either one may be calculated from the measured value of the other).

Four vector quantities, $\overline{EA}$, $\overline{EB}$, $\overline{EC}$, and $\overline{ED}$ are used to describe the vectors originating at the emitter and extending to each of the array elements. Vector loop relationships can be derived where the vector path begins and ends at the same point. A vector extending from the emitter to an array element, from the array element to the wave front tangency point and from the tangency point back to the emitter, is an example of a vector loop. The expressions representing the configuration in FIG. 1 are:

$$\overline{EA} = (Ax-Sx)\hat{i} + (Ay-Sy)\hat{j} - (Az-Sz)\hat{k} = (R+a)\hat{e}â \quad (2)$$

$$\overline{EB} = (Bx-Sx)\hat{i} + (By-Sy)\hat{j} - (Bz-Sz)\hat{k} = (R+b)\hat{e}b̂ \quad (3)$$

$$\overline{EC} = (Cx-Sx)\hat{i} + (Cy-Sy)\hat{j} - (Cz-Sz)\hat{k} = (R+c)\hat{e}ĉ \quad (4)$$

and $$\overline{ED} = -Sx\hat{i} - Sy\hat{j} - Sz\hat{k} = (R)\hat{e}d̂ \quad (5)$$

The terms Ax, Bx, Cx, Ay, By, Cy, Az, Bz, and Cz are the X, Y and Z spatial displacements of elements A, B, and C relative to the reference element D. The terms $\hat{e}â$, $\hat{e}b̂$ and $\hat{e}ĉ$ are the direction unit vectors extending from the emitter to receiver elements A, B, and C, respectively. To solve for the four unknowns, Sx, Sy, Sz and R, only the vector magnitudes need to be considered and the equations may be expressed as follows:

$$|\overline{EA}|^2 = (Ax-Sx)^2 + (Ay-Sy)^2 + (Az-Sz)^2 = (R+a)^2 \quad (6)$$

$$|\overline{EB}|^2 = (Bx-Sx)^2 + (By-Sy)^2 + (Bz-Sz)^2 = (R+b)^2 \quad (7)$$

$$|\overline{EC}|^2 = (Cx-Sx)^2 + (Cy-Sy)^2 + (Cz-Sz)^2 = (R+c)^2 \quad (8)$$

and $$|\overline{ED}|^2 = Sx^2 + Sy^2 + Sz^2 = (R)^2 \quad (9)$$

For planar array configurations, equations (6) through (9) are used to derive the following set of linear equations which describe the three unknowns, R, Sx, and Sy:

$$\begin{bmatrix} -2Ax & -2Ay & -2a \\ -2Bx & -2By & -2b \\ -2Cx & -2Cy & -2c \end{bmatrix} \begin{bmatrix} Sx \\ Sy \\ R \end{bmatrix} = \begin{bmatrix} a^2 - Ax^2 - Ay^2 \\ b^2 - Bx^2 - By^2 \\ c^2 - Cx^2 - Cy^2 \end{bmatrix} \quad (10)$$

A solution for Sz in terms of Sx, Sy, and R is now obtained by using equation 9 and is expressed as $$Sz = +\sqrt{R^2 - Sx^2 - Sy^2} \quad (11)$$

and only the positive real root is acceptable. The position of E is assumed to always reside in the positive half space, therefore, Sz is always positive. However, if the sensing array is not planar then both positive and negative half-spaces are resolved and Sz may be either positive of negative. From the foregoing, it can be seen that the solution to the coordinates of the emitter object in three dimensional Cartesian space is given by Equations (10) and (11). Note that from Equations (10) and (11) it is not necessary to calculate the range of the emitter from the reference in order to solve for the x and y coordinates of the emitter source, thereby providing an instantaneous method for calculating the two dimensional coordinates of the emitter source.

For rapid calculation and efficient implementation of the solution, Equations (10) and (11) can be solved in the closed form as represented by the following Equations (12) through (28).

$$Sx = \frac{K_1 a + K_2 b + K_3 c + (bCy - cBy)a^2 + (cAy - aCy)b^2 + (aBy - bAy)c^2}{K_4 a + K_5 b + K_6 c} \quad (12)$$

$$Sy = \frac{K_7 a + K_8 b + K_9 c + (bCx - cBx)a^2 + (cAx - aCx)b^2 + (aBx - bAx)c^2}{K_4 a + K_5 b + K_6 c} \quad (13)$$

$$R = \frac{K_{10} a^2 + K_{11} b^2 + K_{12} c^2 + K_{13}}{K_4 a + K_5 b + K_6 c} \quad (14)$$

-continued $$S_z = \sqrt{R^2 - S_x^2 - S_y^2} \quad (15)$$

$$K_1 = [cy(Bx^2 + By^2) - By(Cx^2 + Cy^2)] \quad (16)$$

$$K_2 = [Ay(Cx^2 + Cy^2) - Cy(Ax^2 + Ay^2)] \quad (17)$$

$$K_3 = [By(Ax^2 + Ay^2) - Ay(Bx^2 + By^2)] \quad (18)$$

$$K_4 = 2(BxCy - CxBy) \quad (19)$$

$$K_5 = 2(CxAy - AxCy) \quad (20)$$

$$K_6 = 2(AxBy - BxAy) \quad (21)$$

$$K_7 = [Cx(Bx^2 + By^2) - Bx(Cx^2 + Cy^2)] \quad (22)$$

$$K_8 = [Ax(Cx^2 + Cy^2) - Cx(Ax^2 + Ay^2)] \quad (23)$$

$$K_9 = [Bx(Ax^2 + Ay^2) - Ax(Bx^2 + By^2)] \quad (24)$$

$$K_{10} = (BxCy - CxBy) \quad (25)$$

$$K_{11} = (CxAy - AxCy) \quad (26)$$

$$K_{12} = (AxBy - BxAy) \quad (27)$$

$$K_{13} = (CxBy - BxCy)Ax^2 + [CyBy^2 - ByCy^2 - \quad (28)$$
$$ByCx^2 + CyBx^2]Ax - AyCxBx^2 +$$
$$(Cy - CyAy + Cx^2)BxAy + (Ay - By)AyByCx$$

Figure 2:
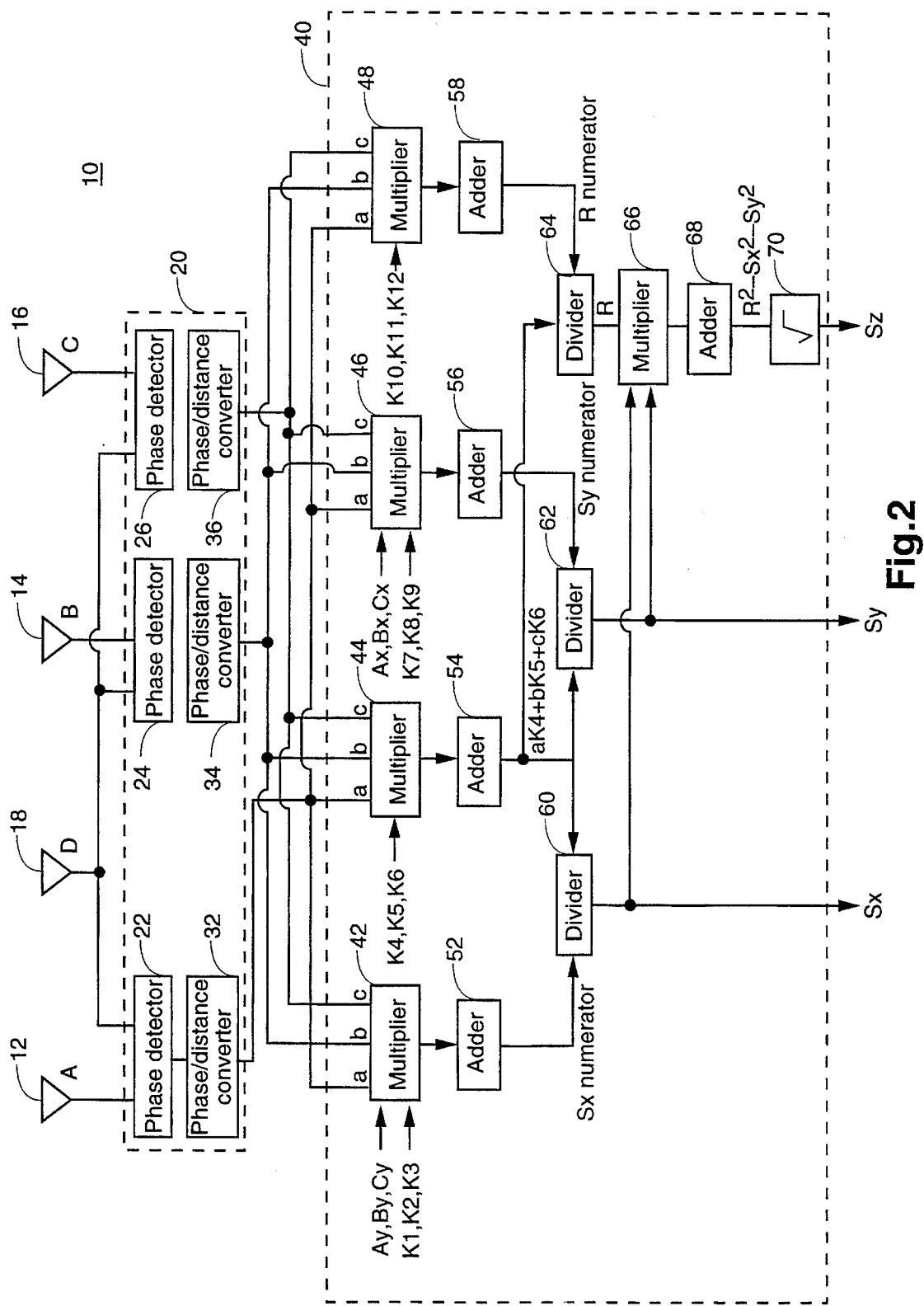
FIG. 2 is a schematic block diagram of the half space coordinate determination or tracking system.

The implementation of the three dimensional half space embodiment of the present invention is shown in FIG. 2. This embodiment consists of four antenna elements designated 12, 14, 16 and 18 located at points A, B, C and D of FIG. 1 respectively. Antenna element D is established as a reference location. The antenna elements are aligned in a planar array and detect either a longitudinal or transverse wave front. Additionally, the wave front can be a unmodulated, randomly modulated, or pulsed energy signal.

The energy collected at antenna elements 12, 14, 16 and 18 is fed to a phase converter system 20 to be translated into time or distance. Energy collected at antenna elements 12, 14, and 16 is transferred to a corresponding plurality of phase detectors 22, 24, and 26 while the energy collected at the reference antenna element 18 is also input into phase detectors 22, 24, and 26. The output of the phase detectors is transmitted to a plurality of phase/distance converters 32, 34, and 36 respectively. The phase/distance converters convert the phase to either a distance parameter, or alternately to a time parameter, as shown in Equation (1).

Output from the phase/distance converters is then transmitted to the position processor 40 for processing the information as described in the closed form solutions set forth in Equations (12) through (28). Alternately, using a digital computer, the position processor could be used to solve either Equations (10) and (11) or the closed form Equations (12) through (28). However, this process is slightly more time consuming. For rapid, real time calculations, the closed form solution is preferred for hardware implementation. As shown in FIG. 2, the output from each phase/distance converter is transmitted to multipliers 42, 44, 46 and 48. The sensor elements y-coordinates, Ay, By, and Cy, as well as constants $K_1$, $K_2$ and $K_3$ are also provided to multiplier 42. Constants $K_4$, $K_5$, and $K_6$ are provided to multiplier 44. The sensor elements x-coordinates Ax, Bx and Cx, and constants $K_7$, $K_8$, and $K_9$ are provided to multiplier 46. Multiplier 48 inputted information consists of constants $K_{10}$, $K_{11}$ and $K_{12}$. The multipliers 42, 44, 46, and 48 perform the multiplication function of Equations (12) through (28) and the output of the multipliers is fed into a corresponding number of adders, denoted in FIG. 2 as 52, 54, 56 and 58 respectively. Adders 52, 54, 56, and 58 perform the addition differencing functions of Equations (12) through (28).

Adder 54 provides the denominator for the Sx, Sy and R calculations and the denominator information is transmitted to dividers 60, 62 and 64. The numerator data for dividers 60, 62 and 64 is provided from the output of adder 52, 56 and 58 respectively. Dividers 60, 62, and 64 perform the division function of Equations (12) through (14) and yield the solutions for Sx, Sy and R respectively. The solutions for Sx, Sy and R is then transmitted to multiplier 66 which performs the squaring functions of Equation (15) while the subsequent addition is performed by adder 68. Finally the Sz coordinate is calculated by taking the square root of the sum $(R^2 - S_x^2 - S_y^2)$. Sx, Sy and Sz represent the x, y and z coordinates of the object.

Figure 3:
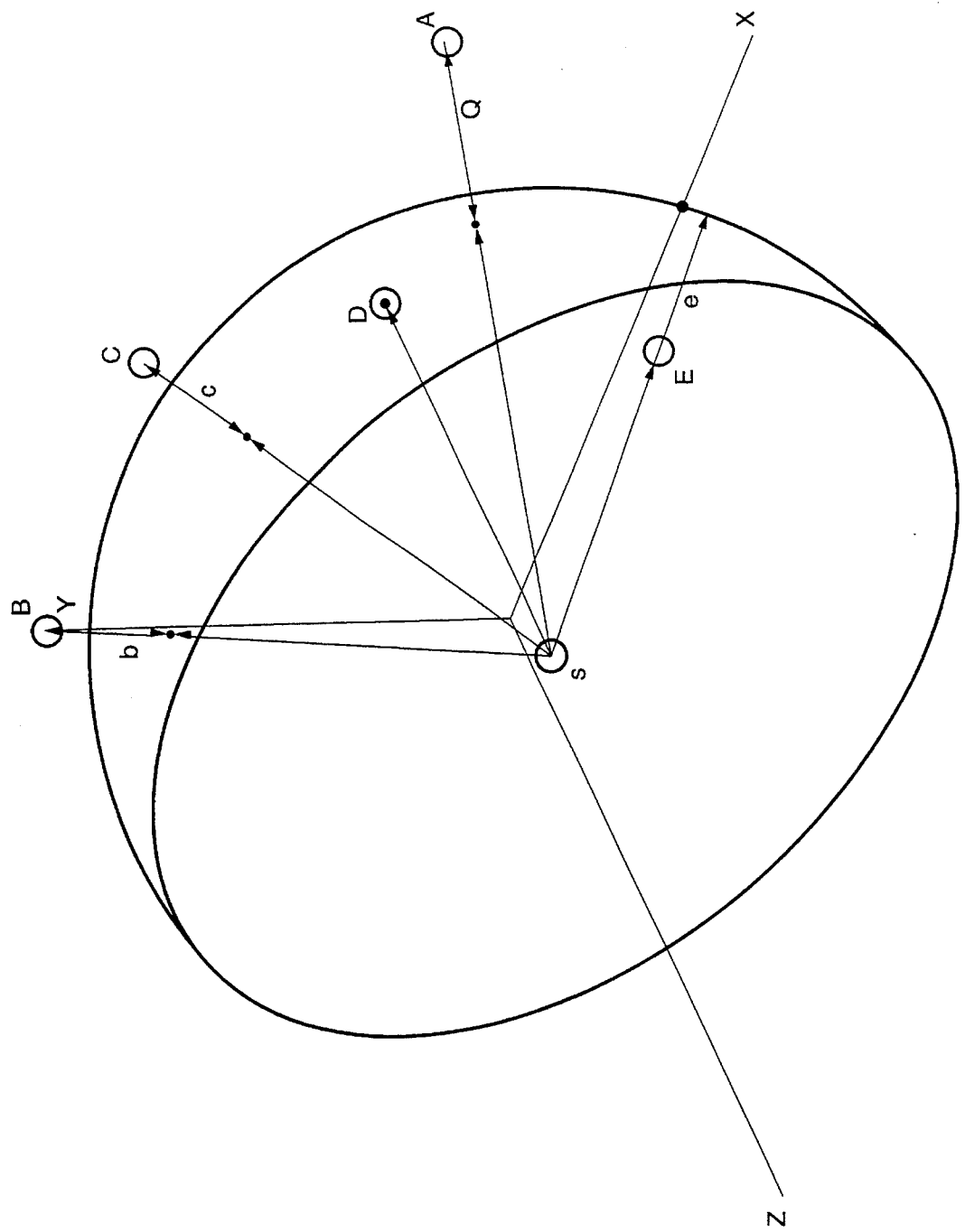
FIG. 3 is a graphical illustration showing the position of the emitter and the antenna elements for the three dimensional full space coordinate determination or tracking.

Referring now to FIG. 3, the configuration of the present invention is shown for the coordinate determination or tracking of an object in three dimensional full space. To track the position or coordinates of an object in three dimensional full space, a non-planar array consisting of a minimum of five elements, depicted in FIG. 3 as elements A, B, C, D, and E, are used for the antenna receiver.

An emitter, represented as S and located at coordinates $X_s$, $Y_s$, and $Z_s$, is shown in FIG. 3 as emitting a propagating spherical wave front. Using the five element sensor array, a closed form solution for finding the location of the emanating point energy source emitting a transverse or longitudinal wave front can be derived. For purposes of the derivation it is assumed that element D is a reference sensor to which all other sensor elements may be compared. The small circles in FIG. 3 represent sensors of either longitudinal or transverse waves. The small filled circles identify the location where a ray cast from the source through the sensor would pierce a sphere representing a feature in the propagating wave front. In some cases the ray pierces the sphere before reaching the sensor (e.g., elements A, B, and C), and in others it pierces the sphere after passing the sensor (e.g., element E). The following sensor position vectors can be written for each sensor element:

$$\vec{A} = Ax\hat{i} + Ay\hat{j} + Az\hat{k} \quad (29)$$

$$\vec{B} = Bx\hat{i} + By\hat{j} + Bz\hat{k} \quad (30)$$

$$\vec{C} = Cx\hat{i} + Cy\hat{j} + Cz\hat{k} \quad (31)$$

$$\vec{D} = Dx\hat{i} + Dy\hat{j} + Dz\hat{k} \quad (32)$$

$$\vec{E} = Ex\hat{i} + Ey\hat{j} + Ez\hat{k} \quad (33)$$

The source position vector is defined as:

$$\vec{S} = Sx\hat{i} + Sy\hat{j} + Sz\hat{k} \quad (34)$$

From these position vectors, the following relative positions vectors for the sensors with respect to the energy source can be written:

$$\vec{SA} = (Ax - Sx)\hat{i} + (Ay - Sy)\hat{j} + (Az - Sz)\hat{k} \quad (35)$$

$$\vec{SB} = (Bx - Sx)\hat{i} + (By - Sy)\hat{j} + (Bz - Sz)\hat{k} \quad (36)$$

$$\vec{SC} = (Cx - Sx)\hat{i} + (Cy - Sy)\hat{j} + (Cz - Sz)\hat{k} \quad (37)$$

$$\vec{SD} = (Dx - Sx)\hat{i} + (Dy - Sy)\hat{j} + (Dz - Sz)\hat{k} \quad (38)$$

$$\vec{SE} = (Ex - Sx)\hat{i} + (Ey - Sy)\hat{j} + (Ez - Sz)\hat{k} \quad (39)$$

The distance from the propagating energy front or wave to each of the sensors as the front passes the reference sensor D is denoted by a lower case letter which is the same as the upper designation for each sensor (i.e., a goes with A). These lengths are measured values that carry a sign with them. Equations 40 through 43 show how the lengths are calculated from phase differences or differences in time of arrival with respect to the reference sensor.

$$a = \frac{\psi_a \lambda}{2\pi} = \Delta t_a \upsilon \quad (40)$$

$$b = \frac{\psi_b \lambda}{2\pi} = \Delta t_b \upsilon \quad (41)$$

$$c = \frac{\psi_c \lambda}{2\pi} = \Delta t_c \upsilon \quad (42)$$

$$e = \frac{\psi_e \lambda}{2\pi} = \Delta t_e \upsilon \quad (43)$$

where $\lambda$ is the free space wavelength, $\psi a$, $\psi b$, $\psi c$ and $\psi e$ are the three phase differences measured in radians, $\alpha t_a$, $\alpha t_b$, $\alpha t_c$ and $\alpha t_e$ are the measured time of arrival for the wave front at each sensor element, and $\upsilon$ is the velocity of the propagating wave. Equations (40) through (43) illustrate the relationship between the time and phase differences of the wave (i.e., either one may be calculated from the measured value of the other).

From Equations (40) through (43) and the vectors shown in FIG. 3, a set of vector loop equations can be written. The loops are degenerate in the sense that the vectors are collinear or have the same unit vector. The assumptions is made that positiveness is in the direction of energy propagation except for the measured quantities which are signed values. The signed values are summed in the following vector loop equations:

$$|\vec{SA}|\hat{s}\hat{a}+a\hat{s}\hat{a}-|\vec{SD}|\hat{s}\hat{a}=0 \quad (44)$$

$$|\vec{SB}|\hat{s}\hat{b}+b\hat{s}\hat{b}-|\vec{SD}|\hat{s}\hat{b}=0 \quad (45)$$

$$|\vec{SC}|\hat{s}\hat{c}+c\hat{s}\hat{c}-|\vec{SD}|\hat{s}\hat{c}=0 \quad (46)$$

$$|\vec{SE}|\hat{s}\hat{e}+e\hat{s}\hat{e}-|\vec{SD}|\hat{s}\hat{e}=0 \quad (47)$$

From these vector loop expressions, the magnitude expressions are as follows:

$$|\vec{SA}|+a-|\vec{SD}|=0 \quad (48)$$

$$|\vec{SB}|+b-|\vec{SD}|=0 \quad (49)$$

$$|\vec{SC}|+c-|\vec{SD}|=0 \quad (50)$$

$$|\vec{SE}|+e-|\vec{SD}|=0 \quad (51)$$

$$|\vec{Sd}|=R \quad (52)$$

By expanding the magnitude equations and simplifying, the following results can be derived:

$$[(Ax-Sx)^2+(Ay-Sy)^2+(Az-Sz)^2]^{1/2}+a-[(Dx-Sx)^2+(Dy-Sy)^2+(Dz-Sz)^2]^{1/2}=0 \quad (53)$$

$$(Ax-Sx)^2+(Ay-Sy)^2+(Az-Sz)^2=(Dx-Sx)^2+(Dy-Sy)^2+(Dz-Sz)^2-2a[(Dx-Sx)^2+(Dy-Sy)^2+(Dz-Sz)^2]^{1/2}+a^2 \quad (54)$$

In equation (53), the radical term can be replaced with R which is the unknown range or distance from the reference sensor to the source. By combining terms and reorganizing, the following equations with unknowns $S_x$, $S_y$, $S_z$ and R can be written:

$$Ax^2-2AxSx+Sx^2+Ay^2-2AySy+Sy^2+Az^2-2AzSz+Sz^2=Dx^2-2DxSx+Sx^2+Dy^2-2DySy+Sy^2+Dz^2-2DzSz+Sz^2-2aR+a^2 \quad (55)$$

$$Ax^2-2AxSx+Ay^2-2AySy+Az^2-2AzSz=Dx^2-2DxSx+Dy^2-2DySy+Dz^2-2DzSz-2aR+a^2 \quad (56)$$

$$2(Dx-Ax)Sx+2(Dy-Ay)Sy+2(Dz-Az)Sz+2aR=Dx^2+Dy^2+Dz^2-Ax^2-Ay^2-Az^2+a^2 \quad (57)$$

Expanding Equations (55) through (57) similarly yields the following equations respectively:

$$2(Dx-Bx)Sx+2(Dy-By)Sy+2(Dz-Bz)Sz+2bR=Dx^2+Dy^2+Dz^2-Bx^2-By^2-Bz^2+b^2 \quad (58)$$

$$2(Dx-Cx)Sx+2(Dy-Cy)Sy+2(Dz-Cz)Sz+2cR=Dx^2+Dy^2+Dz^2-Cx^2-Cy^2-Cz^2+c^2 \quad (59)$$

$$2(Dx-Ex)Sx+2(Dy-Ey)Sy+2(Dz-Ez)Sz+2eR=Dx^2+Dy^2+Dz^2-Ex^2-Ey^2-Ez^2+e^2 \quad (60)$$

From Equations (58) through (60), a matrix representation of the closed form solutions may be written and computer coded. Equation (61) is the matrix representation for five sensors in an arbitrary configuration.

$$\begin{bmatrix} 2(Dx-Ax) & 2(Dy-Ay) & 2(Dz-Az) & 2a \\ 2(Dx-Bx) & 2(Dy-By) & 2(Dx-Bx) & 2b \\ 2(Dx-Cx) & 2(Dy-Cy) & 2(Dx-Cz) & 2c \\ 2(Dx-Ex) & 2(Dy-Ey) & 2(Dz-Ez) & 2e \end{bmatrix} \begin{bmatrix} Sx \\ Sy \\ Sz \\ R \end{bmatrix} =$$

$$\begin{bmatrix} a^2+Dx^2+Dy^2+Dz^2-Ax^2-Ay^2-Az^2 \\ b^2+Dx^2+Dy^2+Dz^2-Bx^2-By^2-Bz^2 \\ c^2+Dx^2+Dy^2+Dz^2-Cx^2-Cy^2-Cz^2 \\ e^2+Dx^2+Dy^2+Dz^2-Ex^2-Ey^2-Ez^2 \end{bmatrix} \quad (61)$$

Note that in Equation (61) it is not necessary to calculate the range of the emitter from the reference in order to solve for the x, y and z coordinates of the emitter source. It is also important to note that a closed form solution for Equation (61) can be used to solve for the three dimensional coordinates of an object in full space. As in FIG. 2, the closed form solution for the full space three dimension coordinates may be implemented. Appendix A provides an example of the closed form solution to Equation (61).

As in conventional interferometry, the phase difference measurement for either the two or three dimensional tracking, is unambiguous only if the phase angle $\psi$ does not exceed $2\pi$. Several known methods may be used to solve the phase ambiguity problems, such as using multiple continuous wave signals differing slightly in frequency or signal modulation techniques.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

APPENDIX A $Sx = -½$
$\{(((Dz - Cz) Ey + (Cy - Dy) Ez + Dy Cz - Cy Dz) b +$
$((-Dz + Bz) Ey + (Dy - By) Ez + By Dz - Dy Bz)c + \%1 e)a^2 +$
$(((Dz - Az) Ey + (-Dy + Ay) Ez + Dy Az - Ay Dz) c + \%8 e) b^2 + \{$
$((Cz - Dz) Ey + (Dy - Cy) Ez - Dy Cz + Cy Dz) b^2 +$
$((Dz - Bz) Ey + (By - Dy) Ez + Dy Bz - By Dz) c^2 + \%2 e^2 + \%, Ex^2 +$
$\%1 Ey^2 + \{((Dz - Cz) Bx^2 + (Dz - Cz) By^2 + (Dz - Cz) Bz^2 + \%5 Bz - Dz Cx^2 -$
$Dz Cy^2 - Dz Cz^2 + \%4 Cz\}Ey + \%1 Ez^2 + \{(Cy - Dy)Bx^2 + (Cy - Dy)By^2 +$
$\%6 By + (Cy - Dy) Bz^2 + Cx^2 Dy + Dy Cy^2 + \%3 Cy + Dy Cz^2\}Ez +$
$(Dy Cz - Cy Dz) Bx^2 + (Dy Cz - Cy Dz) By^2 +$
$\{Dz Cx^2 + Dz Cy^2 + Dz Cz^2 + \%3 Cz\}By + (Dy Cz - Cy Dz) Bz^2 +$
$\{-Cx^2 Dy - Dy Cy^2 + \%4 Cy - Dy Cz^2\}Bz\} a + \{$
$((-Dz + Az) Ey + (Dy - Ay) Ez - Dy Az + Ay Dz) c^2 +$
$((Cz - Dz) Ay + (Dy - Cy) Az - Dy Cz + Cy Dz) e^2 + \%8 Ex^2 + \%8 Ey^2 + \{$
$Dz Cz^2 + \%3 Cz) Ey + \%8 Ez^2 + ((Dy - Cy) Ax^2 + (Dy - Cy) Ay^2 + \%5 Ay +$
$(Dy - Cy) Az^2 - Cx^2 Dy - Dy Cy^2 + \%4 Cy - Dy Cz^2) Ez +$
$(-Dy Cz + Cy Dz) Ax^2 + (-Dy Cz + Cy Dz) Ay^2 +$
$(-Dz Cx^2 - Dz Cy^2 - Dz Cz^2 + \%4 Cz) Ay + (-Dy Cz + Cy Dz) Az^2 +$
$(Cx^2 Dy Cy^2 + \%3 Cy + Dy Cz^2 )Az)b + \%7 e c^2 + ($
$((Dz - Bz)Ay + (By - Dy)Az + Dy Bz - By Dz)e^2 + \%7 Ex^2 + \%7 Ey^2 + ($
$(Dz - Bz) Ax^2 + (Dz - Bz) Ay^2 + (Dz - Bz) Az^2 +$
$(By^2 + Bz^2 - Dy^2 - Dz^2 - Dxhu 2 + Bx^2) Az - Bx^2 Dz - By^2 Dz - Bz^2 Dz - Bz^2Dz +$
$\%4 Bz) Ey + \%7 Ez^2 + ((By - Dy) Ax^2 + (By - Dy) Ay^2 +$
$(Dy^2 - By^2 - Bz^2 - Bx^2 + Dz^2 + Dx^2) Ay + (By - Dy) Az^2 + Dy Bx^2 + Dy By^2 +$
$\%3 By + Dy Bz^2) Ez + (Dy Bz - By Dz) Ax^2 + (Dy Bz - By Dz) Ay^2 +$
$(Bx^2 Dz + By^2 Dz + Bz^2 Dz + \%3 Bz) Ay + (Dy Bz - By Dz) Az^2 +$
$(-Dy Bx^2 - Dy By^2 + \%4 By - Dy Bz^2) Az) c + (\%2 Ax^2 + \%2 Ay^2 +$
$(Cz - Dz) Bx^2 + (Cz - Dz)By^2 + (Cz- Dz)Bz^2 + \%6 Bz + Dz Cx^2 + Dz Cy^2 +$
$Dz Cz^2 + \%3 Cz) Ay + \%2 Az^2 + ((Dy - Cy) Bx^2 + (Dy - Cy) Byhu 2 + \%5 By +$
$(Dy - Cy) Bz^2 - Cx^2 Dy - Dy Cy^2 + \%4 Cy - Dy Cz^2) Az +$
$(-Dy Cz + Cy Dz) Bx^2 + (-Dy Cz + Cy Dz) Byhu 2 +$
$(-Dz Cx^2 - Dz Cy^2 - Dz Cz^2 + \%4 Cz) By + (-Dy Cz + Cy Dz) Bz^2 +$
$(Cx^2 Dy + Dy Cy^2 + \%3 Cy + Dy Cz^2)Bz) e)/((\%2 Ex +$
$((Cz - Dz) Bx + (Dx - Cx) Bz - Dx Cz + Cx Dz)Ey +$
$((Dy - Cy) Bx + (-Dx + Cx)By + Dx Cy - Cx Dy) Ez + (-Dy Cz + Cy Dz) Bx +$
$(-Cx Dz + Dx Cz) By + (Cx Dy - Dx Cy) Bz) a \ldots +$
$(((Cz - Dz) Ay + (Dy - Cy) Az - Dy Cz + Cy Dz) Ex +$
$((Dz - Cz) Ax + (-Dx + Cx) Az - Cx Dz + Dx Cz) Ey +$
$((Cy - Dy) Ax + (Dx - Cx) Ay + Cx Dy - Dx Cy) Ez + (Dy Cz - Cy Dz) Ax +$
$(-Dx Cz + Cx Dz) Ay + (Dx Cy - Cx Dy) Az) b +$
$(((Dz - Bz) Ay + (By - Dy) Az + Dy Bz - By Dz) Ex +$
$((-Dz + Bz) Ax + (Dx - Bx) Az - Dx Bz + Bx Dz) Ey +$
$((Dy -By) Ax + (Bx - Dx) Ay + Dx By - Bx Dy) Ez + (By Dz - Dy Bz) Ax +$
$(Dx Bz - Bx Dz) Ay + (-Dx By + Bx Dy) Az) c + (\%1 Ax +$
$((Dz - Cz) Bx + (-Dx + Cx) Bz - Cx Dz + Dx Cz) Ay +$
$((Cy - Dy) Bx + (Dx - Cx) By + Cx Dy - Dx Cy) Az + (Dy Cz - Cy Dz) Bx +$
$(-Dx Cz + Cx Dz) By + (Dx Cy - Cx Dy) Bz) e)$
$\%I: = (Cz - Dz)By + (Dy - )Bz - Dy Cz + Cy Dz$
$\%2: = (Dz - Cz) By + (Cy - Dy) Bz + Dy Cz - Cy Dz$
$\%3: = -Dx^2 - Dz^2 - Dy^2$
$\%4: = Dy^2 + Dz^2 + Dx^2$
$\%5: = -Dx^2 - Dz^2 + Cy^2 - Dy^2 + Cz^2 + Cx^2$
$\%6: = Dy^2 + Dx^2 - Cz^2 - Cx^2 + Dz^2 - Cy^2$
$\%7: = (-Dz + Bz) Ay + (Dy - By) Az + By Dz - Dy Bz$
$\%8: = (Dz - Cz) Ay + (Cy - Dy) Az + Dy Cz - Cy Dz$
$Sy = ½$
$((((Dz - Cz) Ex + (-Dx + Cx) Ez - Cx Dz + Dx Cz) b +$
$((-Dz + Bz)Ex + (Dx - Bx)Ez - Dx Bz + Bx Dz) c + \%4 e) a^2 +$
$(((Dz - Az) Ex + (-Dx + Ax) Ez + Az Dx - Dz Ax) c + \%3 e) b^2 +$
$(((Cz - Dz) Ex + (Dx - Cx) Ez - Dx Cz + Cx Dz) b^2 +$
$((Dz - Bz) Ex + (Bx - Dx) Ez + Dx Bz - Bx Dz) c^2 + \%1 e^2 + \%4 Ex^2 +$
$((Dz - Cz) Bx^2 + (Dz - Cz) By^2 + (Dz - Cz) Bz^2 + \%7 Bz - Dz CX^2 - Dz cy^2 -$
$Dz Cz^2 + \%6 Cz\} Ex + \%4 Ey^2 + \%4 Ez^2 + \{(-Dx + Cx) Bx^2 + \%8 Bx +$
$(-Dx + Cx) By^2 + (-Dx + Cx) Bz^2 + Cx^2 Dx + \%5 Cx + Dx Cz^2 + Dx Cy^2\} Ez +$
$(-Cx Dz + Dx Cz) Bx^2 + \{Dz Cx^2 + Dz Cy^2 + Dz Cz^2 + \%5 Cz\} Bx +$
$(-Cx Dz + Dx Cz) By^2 + (-Cx Dz + Dx Cz) Bz^2 +$
$\{-Cx^2 Dx + \%6 Cx - Dx Cy^2 - Dx Cz^2\} Bz\} a +$
$\{((-Dz + Az) Ex + (Dx - Ax) Ez + Dz Ax - Az Dx) c^2 +$
$((Cz - Dz) Ax + (Dx - Cx) Az - Dx Cz + Cx Dz) e^2 + \%3 Ex^2 +$
$\{(Cz - Dz) Ax^2 + (Cz - Dz) Ay^2 + (Cz - Dz) Az^2 + \%8 Az + Dz Cx^2 + Dz CY^2 +$
$Dz Cz^2 + \%5 Cz\} Ex + \%3 Ey^2 + \%3 Ez^2 + \{(Dx - Cx) Ax^2 + \%7 Ax +$
$(Dx - Cx) Ay^2 + (Dx - Cx) Az^2 - Cx^2 Dx + \%6 Cx - Dx Cy^2 - Dx Cz^2\} Ez + \ldots$
$(-Dx Cz + Cx Dz) Ax^2 + \{-Dz CX^2 - Dz Cy^2 - Dz Cz^2 + \%6 Cz\} Ax +$
$(-Dx Cz + Cx Dz) Ay^2 + (-Dx Cz + Cx Dz) Az^2 +$
$\{Cx^2 Dx + \%5 Cx + Dx Cz^2 + Dx Cy^2\} Az\} b + \%2 e C^2 +$
$\{((Dz - Bz) Ax + (Bx - Dx) Az + Dx Bz - Bx Dz) e^2 + \%2 Ex^2 + \{(Dz - Bz) Ax^2 +$
$(Dz - Bz) Ay^2 + (Dz - Bz) Az^2 + \{By^2 + Bz^2 - Dy^2 - Dz^2 - Dx^2 + Bx^2\} Az -$
$Bx^2 Dz - By^2 Dz - Bz^2 Dz + \%6 Bz\} Ex + \%2 Ey^2 + \%2 Ez^2 + \{(Bx - Dx) Ax^2 +$
$\{Dy^2 - By^2 - Bz^2 - Bx^2 + Dz^2\} Ax + (Bx - Dx) Ay^2 + (Bx - Dx) Az^2 +$ APPENDIX A-continued $Dx\ Bx^2 + \%5\ Bx + Dx\ By^2 + Dx\ Bz^2\}\ Ez + (Dx\ Bz - Bx\ Dz)\ Ax^2 +$
$\{Bx^2\ Dz + By^2\ Dz + Bz^2\ Dz + \%5\ Bz\}\ Ax + (Dx\ Bz - Bx\ Dz)\ Ay^2 +$
$(Dx\ Bz - Bx\ Dz)\ Az^2 + \{-Dx\ Bx^2 + \%6\ Bx - Dx\ By^2 - Dx\ Bz^2\}\ Az\}\ c +$
$\{\%1\ Ax^2 + \{(Cz - Dz)\ Bx^2 + (Cz - Dz)\ By^2 + (Cz - Dz)\ Bz^2 + \%8\ Bz + Dz\ CX^2 +$
$Dz\ Cy^2 + Dz\ Cz^2 + \%5\ Cz\}\ Ax + \%1,\ Ay^2 + \%1\ Az^2 + \{(Dx - Cx)\ Bx^2 + \%7\ Bx +$
$(Dx - Cx)\ By^2 + (Dx - Cx)\ Bz^2 - Cx^2\ Dx + \%6\ Cx - Dx\ Cy^2 - Dx\ Cz^2\}\ Az +$
$(-Dx\ Cz + Cx\ Dz)\ Bx^2 + \{-Dz\ Cx^2 - Dz\ Cy^2 - Dz\ Cz^2 + \%6\ Cz\}\ Bx +$
$(-Dx\ Cz + Cx\ Dz)\ By^2 + (-Dx\ Cz + Cx\ Dz)\ Bz^2 +$
$\{CX^2\ Dx + \%5\ Cx + Dx\ Cz^2 + Dx\ Cy^2\}Bz\}\ e\}/$
$((Dz - Cz)\ By + (Cy - Dy)\ Bz + Dy\ Cz - Cy\ Dz)\ Ex + \%4\ Ey +$
$((Dy - Cy)\ Bx + (-Dx + Cx)\ By + Dx\ Cy - Cx\ Dy)\ Ez + (-Dy\ Cz + Cy\ Dz)\ Bx +$
$(-Cx\ Dz + Dx\ Cz)\ By + (Cx\ Dy - Dx\ Cy)\ Bz)\ a +$
$(((Cz - Dz)\ Ay + (Dy - Cy)\ Az - Dy\ Cz + Cy\ Dz)\ Ex + \%3\ Ey +$
$((Cy - Dy)\ Ax + (Dx - Cx)\ Ay + Cx\ Dy - Dx\ Cy)\ Ez + (Dy\ Cz - Cy\ Dz)\ Ax +$
$(- Dx\ Cz + Cx\ Dz)\ Ay + (Dx\ Cy - Cx\ Dy)\ Az)\ b +$
$((((Dz - Bz)\ Ay + (By - Dy)\ Az + Dy\ Bz - By\ Dz)\ Ex + \%2\ Ey +$
$((Dy - By)\ Ax + (Bx - Dx)\ Ay + Dx\ By - Bx\ Dy)\ Ez + (By\ Dz - Dy\ Bz)\ Ax +$
$(Dx\ Bz - Bx\ Dz)\ Ay + (-Dx\ By + Bx\ Dy)\ Az)\ c +$
$(((Cz - Dz)\ By + (Dy - Cy)\ Bz - Dy\ Cz + Cy\ Dz)\ Ax + \%1\ Ay +$
$((Cy - Dy)\ Bx + (Dx - Cx)\ By + Cx\ Dy - Dx\ Cy)\ Az + (Dy\ Cz - Cy\ Dz)\ Bx +$
$(- Dx\ Cz + Cx\ Dz)\ By + (Dx\ Cy - Cx\ Dy)\ Bz)\ e)$
$\%1: = (Dz - Cz)\ Rx + (-Dx + Cx)\ Bz - Cx\ Dz + Dx\ Cz$
$\%2: = (-Dz + Bz)\ Ax + (Dx - Bx)\ Az - Dx\ Bz + Bx\ Dz$
$\%3: = (Dz - Cz)\ Ax + (-Dx + Cx)\ Az - Cx\ Dz + Dx\ Cz$
$\%4: = (Cz - Dz)\ Bx + (Dx - Cx)\ Bz - Dx\ Cz + Cx\ Dz$
$\%5: = -Dx^2 - Dz^2 - Dy^2$
$\%6: = Dy^2 + Dz_2 + Dx^2$
$\%7: = -Dx^2 - Dz^2 + Cy^2 - Dy^2 + Cz^2 + Cx^2$
$\%8: = Dy^2 + Dx^2 - Cz^2 - Cx^2 + Dz^2 - Cy^2$
$Sz = \frac{1}{2}$
$\{((((-Dy + Cy)\ Ex + (Dx - Cx)\ Ey - Dx\ Cy + Cx\ Dy)\ b +$
$((Dy - By)\ Ex + (Bx - Dx)\ Ey + Dx\ By - Bx\ Dy)\ c + \%1\ e)\ a^2 +$
$(((-Dy + Ay)\ Ex + (Dx - Ax)\ Ey + Ax\ Dy - Dx\ Ay)\ c + \%8\ e)\ b^2 +$
$\{((Dy - Cy)\ Ex + (-Dx + Cx)\ Ey - Cx\ Dy + Dx\ Cy)\ b^2 +$
$((By - Dy)\ Ex + (Dx - Bx)\ Ey - Dx\ By + Bx\ Dy)\ c^2 + \%2\ e^2 + \%1\ Ex^2 +$
$\{(-Dy + Cy)\ Bx^2 + (-Dy + Cy)\ By^2 + \%5\ By + (-Dy + Cy)\ Bz^2 + Dy\ Cx^2 + Dy\ Cy^2 +$
$\%4\ Cy + Dy\ Cz^2\}\ Ex + \%1\ Ey^2 + \{(Dx - Cx)\ Bx^2 + \%6\ Bx + (Dx - Cx)\ By^2 +$
$(Dx - Cx)\ Bz^2 - Dx\ Cx^2 + \%3\ Cx - Dx\ Cz^2 - Dx\ Cy^2\}\ Ey + \%1\ Ez^2 +$
$(-Dx\ Cy + Cx\ Dy)\ Bx^2 + \{-Dy\ Cx^2 - Dy\ Cy^2 + \%3\ Cy - Dy\ Cz^2\}\ Bx +$
$(-Dx\ Cy + Cx\ Dy)\ Bz^2\}\ a +$
$\{((Dy - Ay)\ Ex + (-Dx + Ax)\ Ey - Ax\ Dy + Dx\ Ay)\ c^2 +$
$((Dy - Cy)\ Ax + (-Dx + Cx)\ Ay - Cx\ Dy + Dx\ Cy)\ e^2 + \%8\ Ex^2 +$
$\{(Dy - Cy)\ Ax^2 + (Dy - Cy)\ Ay^2 + \%6\ Ay + (Dy - Cy)\ Az^2 - Dy\ Cx^2 - Dy\ Cy^2 +$
$\%3\ Cy - Dy\ Cz^2\}\ Ex + \%8\ Ey^2 + \{(-Dx + Cx)\ Ax^2 + \%5\ Ax + (-Dx + Cx)\ Ay^2 +$
$(-Dx + Cx)\ Az^2 + Dx\ Cx^2 + \%4\ Cx + Dx\ Cz^2 + Dx\ Cy^2\}\ Ey + \%8\ Ez^2 +$
$(-Cx\ Dy + Dx\ Cy)\ Ax^2 + \{Dy\ Cx^2 + Dy\ Cy^2 + \%4\ Cy + Dy\ Cz^2\}\ Ax +$
$(-Cx\ Dy + Dx\ Cy)\ Ay^2 + \{-Dx\ Cx^2 + \%3\ Cx - Dx\ Cz^2 - Dx\ Cy^2\}\ Ay +$
$(-Cx\ Dy + Dx\ Cy)\ Az^2\}\ b + \%7\ e\ c^2 +$
$\{((By - Dy)\ Ax + (Dx - Bx)\ Ay + Bx\ Dy - Dx\ By)\ e^2 + \%7\ Ex^2 + \{(By - Dy)\ Ax^2 +$
$(By - Dy)\ Ay^2 + \{-Bx^2 + Dy^2 + Dx^2 - By^2 + Dz^2 - Bz^2\}\ Ay + (By - Dy)\ Az^2 +$
$Dy\ Bx^2 + Dy\ By^2 + \%4\ By + Dy\ Bz^2\}\ Ex + \%7\ Ey^2 + \{(Dx - Bx)\ Ax^2 +$
$\{By^2\ 30\ Bz^2 - Dy^2 + Bx^2 - Dz^2 - Dx^2\}\ Ax + (Dx - Bx)\ Ay^2 + (Dx - Bx)\ Az^2 -$
$Dx\ Bx^2 + \%3\ Bx - Dx\ By^2 - Dx\ Bz^2\}\ Ey + \%7\ Ez^2 + (Bx\ Dy - Dx\ By)\ Ax^2 +$
$\{-Dy\ Bx^2 - Dy\ By^2 + \%3\ By - Dy\ Bz^2\}\ Ax + (Bx\ Dy - Dx\ By)\ Ay^2 +$
$\{Dx\ Bx^2\ \%4\ Bx + Dx\ Bz^2 + Dx\ By^2\}\ Ay + (Bx\ Dy - Dx\ By)\ Az^2\}\ c + \{\%2\ Ax^2 +$
$\{(Dy - Cy)\ Bx^2 + (Dy - Cy)\ By^2 + \%6\ By + (Dy - Cy)\ Bz^2 - Dy\ Cx^2 - Dy\ Cy^2 +$
$\%3\ Cy - Dy\ Cz^2\}\ Ax + \%2\ Ay^2 + \{(-Dx + Cx)\ Bx^2 + \%5\ Bx + (-Dx + Cx)\ By^2 +$
$(-Dx + Cx)\ Bz^2 + Dx\ Cx^2 + \%4\ Cx + Dx\ Cz^2 + Dx\ Cy^2\}\ Ay + \%2\ Az^2 +$
$(-Cx\ Dy + Dx\ Cy)\ Bx^2 + \{Dy\ Cx^2 + Dy\ Cy^2 + \%4\ Cy + Dy\ Cz^2\}\ Bx +$
$(-Cx\ Dy + Dx\ Cy)\ By^2 + \{-Dx\ Cx^2 + \%3\ Cx - Dx\ Cz^2 - Dx\ Cy^2\}\ By +$
$(-Cx\ Dy + Dx\ Cy)\ Bz^2\}\ e\}/$
$((((-Dz + Cz)\ By + (Dy - Cy)\ Bz + Cy\ Dz - Dy\ Cz)\ Ex +$
$((Dz - Cz)\ Bx + (-Dx + Cx)\ Bz - Cx\ Dz + Dx\ Cz)\ Ey + \%2\ Ez +$
$(-Cy\ Dz + Dy\ Cz)\ Bx + (Cx\ Dz - Dx\ Cz)\ By + (-Cx\ Dy + Dx\ Cy)\ Bz)\ a + \ldots$
$(((Dz - Cz)\ Ay + (-Dy + Cy)\ Az - Cy\ Dz + Dy\ Cz)\ Ex +$
$((-Dz + Cz)\ Ax + (Dx - Cx)\ Az + Cx\ Dz - Dx\ Cz)\ Ey +$
$((Dy - Cy)\ Ax + (-Dx + Cx)\ Ay - Cx\ Dy + Dx\ Cy)\ Ez + (Cy\ Dz - Dy\ Cz)\ Ax +$
$(-Cx\ Dz + Dx\ Cz)\ Ay + (-Dx\ Cy + Cx\ Dy)\ Az)\ b +$
$(((Bz - Dz)\ Ay + (Dy - By)\ Az + By\ Dz - Dy\ Bz)\ Ex +$
$((Dz - Bz)\ Ax + (Bx - Dx)\ Az - Bx\ Dz + Dx\ Bz)\ Ey +$
$((By - Dy)\ Ax + (Dx - Bx)\ Ay + Bx\ Dy - Dx\ By)\ Ez + (-By\ Dz + Dy\ Bz)\ Ax +$
$(-Dx\ Bz + Bx\ Dz)\ Ay + (Dx\ By - Bx\ Dy)\ Az)\ c +$
$(((Dz - Cz)\ By + (-Dy + Cy)\ Bz - Cy\ Dz + Dy\ Cz)\ Ax +$
$((-Dz + Cz)\ Bx + (Dx - Cx)\ Bz + Cx\ Dz - Dx\ Cz)\ Ay + \%1\ Az +$
$(Cy\ Dz - Dy\ Cz)\ Bx + (-Cx\ Dz + Dx\ Cz)\ By + (-Dx\ Cy + Cx\ Dy)\ Bz)\ e) +$
$\%1: = (Dy - Cy)\ Bx + (-Dx + Cx)\ By - Cx\ Dy + Dx\ Cy$
$\%2: = (-Dy + Cy)\ Bx + (Dx - Cx)\ By - Dx\ Cy + Cx\ Dy$
$\%3: = Dx^2 + Dz^2 + Dy^2$
$\%4: = -Dy^2 - Dz^2 - Dx^2$

APPENDIX A-continued

%5: = $Dx^2 - Cx^2 + Dz^2 - Cy^2 + Dy^2 - Cz^2$
%6: = $-Dy^2 - Dx^2 + Cx^2 + Cz^2 + Cy^2 - Dz^2$
%7: = $(Dy - By) Ax + (Bx - Dx) Ay - Bx Dy + Dx By$
%8: = $(-Dy + Cy) Ax + (Dx - Cx) Ay - Dx Cy + Cx Dy$

---

The embodiments of this invention in which an exclusive property or privilege is claimed are defined as follows:

1. A system for determining instantaneously, the half space three dimensional spatial coordinates of a moving or stationary emitter source, comprising:

(a) receiver means for receiving a radiated energy signal, said receiver means being comprised of a plurality of reception elements established in a planar configuration, each reception element being located at a known element position;

(b) converter means in communication with said receiving means for converting the energy signal received by each reception element into a magnitude signal proportional to the energy signal received by each reception element;

(c) position processing means in communication with said converter means for calculating in real time the half space three dimensional position of the emitter source based upon a closed form solution of a set of linear equations derived from a vector loop relationship established for each reception element, said vector loop relationship comprising the magnitude of vectors formed from the emitter source to each reception element, from each reception element to a wave front tangency point and from the wave front tangency point back to the emitter source.

2. The system of claim 1 wherein for each reception element, the magnitude signal is equivalent to $\psi_n \lambda / 2\pi$, where $\psi_n$ represents the phase of the energy signal measured at the each reception element and $\lambda$ represents the wavelength of the radiated energy signal.

3. The system of claim 1 wherein for each reception element, the magnitude signal is equivalent to $\Delta t_n \upsilon$, where $\Delta t_n$ represents measured time difference of arrival of the radiated energy signal at each reception element with respect to a reference reception element and $\upsilon$ represents the velocity of the radiated energy signal.

4. The system of claim 1 wherein the number of reception elements is at least four elements.

5. The system of claim 1 wherein the radiating energy signal is a propagating longitudinal wave front having a frequency of between 200 Hz and 20 kHz.

6. The system of claim 1 wherein the radiating energy signal is a transverse wave front having a frequency of between 27 MHz and 23 GHz.

7. The system of claim 1 wherein the radiated energy signal is an unmodulated energy wave.

8. The system of claim 1 wherein the radiated energy signal is a randomly modulated energy wave.

9. The system of claim 1 wherein the radiated energy signal is a pulsed electromagnetic signal.

10. The system of claim 1 wherein the real time half space three dimension position of the emitter source is calculated in step (c) by solving the matrix equation represented by $$\begin{bmatrix} -2Ax & -2Ay & -2a \\ -2Bx & -2By & -2b \\ -2Cx & -2Cy & -2c \end{bmatrix} \begin{bmatrix} Sx \\ Sy \\ R \end{bmatrix} = \begin{bmatrix} a^2 - Ax^2 - Ay^2 \\ b^2 - Bx^2 - By^2 \\ c^2 - Cx^2 - Cy^2 \end{bmatrix}$$

and the equation $$Sz = + \sqrt{R^2 - Sx^2 - Sy^2}$$

where Sx, Sy and SZ represent the three dimensional position of the emitter source, R is the range between the emitter source and an established reception element, Ax, Bx, Cx, Ay, By, and Cy represent the x and y coordinates of the reception elements and a, b, and c represent the magnitude signals converted by said converting means.

11. The system of claim 10 wherein the closed form solution of matrix equation is solved to calculate the real time three dimensional position of the emitter source.

12. A system for determining instantaneously, the full space three dimensional spatial coordinates of a moving or stationary emitter source, comprising:

(a) receiver means for receiving a radiated energy signal, said receiver means being comprised of a plurality of reception elements, said reception elements being aligned in a non-planar configuration and located at a known element position;

(b) converter means in communication with said receiving means for converting the energy signal received by each reception element into a magnitude signal proportional to the energy signal received by each reception element;

(c) position processing means in communication with said converter means for calculating in real time the full space three dimensional position of the emitter source based upon solving a closed form solution of a set of linear equations derived from vector loop relationship established for each reception element, said vector loop relationship comprising the magnitude of vectors formed from the emitter source to each reception element, from each reception element to a wave front tangency point and from the wave front tangency point back to the emitter source.

13. The system of claim 12 wherein for each reception element, the magnitude signal is equivalent to $\psi_n \lambda / 2\pi$, where $\psi_n$ represents the phase of the energy signal measured at the each reception element and $\lambda$ represents the wavelength of the radiated energy signal.

14. The system of claim 12 wherein for each reception element, the magnitude signal is equivalent to $\Delta t_n \upsilon$, where $\Delta t_n$ represents the measured time difference of arrival of the radiated energy signal at each reception element with respect to a reference reception element and $\upsilon$ represents the velocity of the radiated energy signal.

15. The system of claim 12 wherein the real time three dimensional position of the emitter source is calculated in step (c) by solving the matrix equation represented by $$\begin{bmatrix} 2(Dx-Ax) & 2(Dy-Ay) & 2(Dz-Az) & 2a \\ 2(Dx-Bx) & 2(Dy-By) & 2(Dx-Bx) & 2b \\ 2(Dx-Cx) & 2(Dy-Cy) & 2(Dx-Cz) & 2c \\ 2(Dx-Ex) & 2(Dy-Ey) & 2(Dz-Ez) & 2e \end{bmatrix} \begin{bmatrix} Sx \\ Sy \\ Sz \\ R \end{bmatrix} =$$

$$\begin{bmatrix} a^2 + Dx^2 + Dy^2 + Dz^2 - Ax^2 - Ay^2 - Az^2 \\ b^2 + Dx^2 + Dy^2 + Dz^2 - Bx^2 - By^2 - Bz^2 \\ c^2 + Dx^2 + Dy^2 + Dz^2 - Cx^2 - Cy^2 - Cz^2 \\ e^2 + Dx^2 + Dy^2 + Dz^2 - Ex^2 - Ey^2 - Ez^2 \end{bmatrix}$$

where Sx, Sy and SZ represent the three dimensional position of the emitter source, R is the range between the emitter source and an established reference reception element, Ax, Bx, Cx, Dx, Ex, Ay, By, Cy, Dy, Ey, Az, Bz, Cz, Dz and Ez represent the x, y and z coordinates of the reception elements and a, b, c, d and e represent the magnitude signals converted by said converting means.

16. The system of claim 15 wherein the closed form solution of matrix equation is solved to calculate the real time three dimensional position of the emitter source in full space.

17. The system of claim 12 wherein the number of reception elements is at least five elements.

18. The system of claim 12 wherein the radiating energy signal is a propagating longitudinal wave front having a frequency of between 200 Hz and 20 kHz.

19. The system of claim 12 wherein the radiating energy signal is a transverse wave front having a frequency of between 27 MHz and 23 GHz.

20. A method for locating in real time, the half space three dimensional spatial coordinates of a moving or stationary object, the steps comprising:

(a) establishing a plurality of receiver elements in planar configuration, each element being spaced from an adjacent element by a fixed distance parameter;

(b) receiving a radiated energy signal by the plurality of receiver elements;

(c) calculating for each receiver element a magnitude signal proportional to the energy signal received by the receiver element;

(d) determining in real time the half space three dimensional position of the emitter source based upon a closed form solution of a set of linear equations derived from a vector loop relationship established for each reception element, said vector loop relationship comprising the magnitude of vectors formed from the emitter source to each reception element, from each reception element to a wave front tangency point and from the wave front tangency point and from the wave front tangency point back to the emitter source.

21. The method of claim 20 wherein for each receiver element, the magnitude signal is equivalent to $\psi_n \lambda/2\pi$, where $\psi_n$ represents the phase of the energy signal received at the each reception element and $\lambda$ represents the wavelength of the radiated energy signal.

22. The method of claim 20 wherein for each receiver element, the magnitude signal is equivalent to $\Delta t_n \upsilon$, where $\Delta t_n$ represents the measured time difference of arrival of the radiated energy signal at each receiver element with respect to a reference receiver element and $\upsilon$ represents the velocity of the radiated energy signal.

23. The method of claim 20 wherein the number of receiver elements is at least four elements.

24. The method of claim 20 wherein the radiating energy signal is a propagating longitudinal wave front having a frequency of between 200 Hz and 20 kHz.

25. The method of claim 20 wherein the radiating energy signal is a transverse wave front having a frequency of between 27 MHz and 23 GHz.

26. The method of claim 20 wherein the radiated energy signal is an unmodulated energy wave.

27. The method of claim 20 wherein the radiated energy signal is a randomly modulated energy wave.

28. The method of claim 20 wherein the radiated energy signal is a pulsed electromagnetic signal.

29. The method of claim 20 wherein the real time, half space three dimension position of the emitter source is calculated in step (c) by solving the matrix equation represented by $$\begin{bmatrix} -2Ax & -2Ay & -2a \\ -2Bx & -2By & -2b \\ -2Cx & -2Cy & -2c \end{bmatrix} \begin{bmatrix} Sx \\ Sy \\ R \end{bmatrix} = \begin{bmatrix} a^2 - Ax^2 - Ay^2 \\ b^2 - Bx^2 - By^2 \\ c^2 - Cx^2 - Cy^2 \end{bmatrix}$$

and the equation $$Sz = +\sqrt{R^2 - Sx^2 - Sy^2}$$

where Sx, Sy and SZ represent the three dimensional position of the emitter source, R is the range between the emitter source and an established reference receiver element, Ax, Bx, Cx, Ay, By, and Cy represent the x and y coordinates of the receiver elements and a, b, and c represent the magnitude signals calculated in step (c).

30. The method of claim 29 wherein the closed form solution of matrix equation is solved to calculate the real time three dimensional position of the emitter source.

31. A method for locating in real time, the full space three dimensional spatial coordinates of a moving or stationary object, the steps comprising:

(a) establishing an plurality of receiver elements in a non-planar configuration, each element being spaced from an adjacent element by a fixed distance parameter;

(b) receiving energy signals by the plurality of receiver elements;

(c) calculating a plurality of distance oriented signals, said distance oriented signals being proportional to the energy signals received by the receiver elements;

(d) determining in real time the full space three dimensional position of the emitter source based upon solving a closed form solution of a set of linear equations derived from vector loop relationship established for each reception element, said vector loop relationship comprising the magnitude of vectors formed from the emitter source to each reception element, from each reception element to a wave front tangency point and from the wave front tangency point back to the emitter source.

32. The method of claim 31 wherein for each receiver element, the magnitude signal is equivalent to $\psi_n \lambda/2\pi$, where $\psi_n$ represents the phase of the energy signal measured at the each receiver element and $\lambda$ represents the wavelength of the radiated energy signal.

33. The method of claim 31 wherein for each receiver element, the magnitude signal is equivalent to $\Delta t_n \upsilon$, where $\Delta t_n$ represents the measured time difference of arrival of the radiated energy signal at each receiver element with respect to a reference receiver element and $\upsilon$ represents the velocity of the radiated energy signal.

34. The method of claim 31 wherein the number of receiver elements is at least five elements.

35. The method of claim 31 wherein the radiating energy signal is a propagating longitudinal wave front having a frequency of between 200 Hz and 20 kHz.

36. The method of claim 31 wherein the radiating energy signal is a transverse wave front having a frequency of between 27 MHz and 23 GHz.

37. The method of claim 31 wherein the radiated energy signal is an unmodulated energy wave.

38. The method of claim 31 wherein the radiated energy signal is a randomly modulated energy wave.

39. The method of claim 31 wherein the radiated energy signal is a pulsed electromagnetic signal.

40. The method of claim 39 wherein the real time three dimensional position of the emitter source is calculated in step (c) by solving the matrix equation represented by $$\begin{bmatrix} 2(Dx-Ax) & 2(Dy-Ay) & 2(Dz-Az) & 2a \\ 2(Dx-Bx) & 2(Dy-By) & 2(Dx-Bx) & 2b \\ 2(Dx-Cx) & 2(Dy-Cy) & 2(Dx-Cz) & 2c \\ 2(Dx-Ex) & 2(Dy-Ey) & 2(Dz-Ez) & 2e \end{bmatrix} \begin{bmatrix} Sx \\ Sy \\ Sz \\ R \end{bmatrix} =$$

-continued $$\begin{bmatrix} a^2 + Dx^2 + Dy^2 + Dz^2 - Ax^2 - Ay^2 - Az^2 \\ b^2 + Dx^2 + Dy^2 + Dz^2 - Bx^2 - By^2 - Bz^2 \\ c^2 + Dx^2 + Dy^2 + Dz^2 - Cx^2 - Cy^2 - Cz^2 \\ e^2 + Dx^2 + Dy^2 + Dz^2 - Ex^2 - Ey^2 - Ez^2 \end{bmatrix}$$

where Sx, Sy and SZ represent the three dimensional position of the emitter source, R is the range between the emitter source and an established reference receiver element, Ax, Bx, Cx, Dx, Ex, Ay, By, Cy, Dy, Ey, Az, Bz, Cz, Dz and Ez represent the x, y and z coordinates of the receiver elements and a, b, c, d and e represent the magnitude signals calculated in step (c).

41. The method of claim 40 wherein the closed form solution of matrix equation is solved to calculate the real time three dimensional position of the emitter source.

* * * * *